United States Patent
Ohashi et al.

(10) Patent No.: US 7,651,618 B2
(45) Date of Patent: Jan. 26, 2010

(54) METHOD AND APPARATUS FOR TREATMENT OF AN EFFLUENT CONTAINING RADIOACTIVE MATERIALS

(75) Inventors: Shinichi Ohashi, Sagamihara (JP); Shinya Ubukata, Tokyo (JP)

(73) Assignee: Organo Corporation, Tokyo (JP)

( * ) Notice: Subject to any disclaimer, the term of this patent is extended or adjusted under 35 U.S.C. 154(b) by 147 days.

(21) Appl. No.: 11/851,198

(22) Filed: Sep. 6, 2007

(65) Prior Publication Data

US 2008/0156735 A1 Jul. 3, 2008

(30) Foreign Application Priority Data

Sep. 11, 2006 (JP) ............... 2006-245293

(51) Int. Cl.
*C02F 3/00* (2006.01)
(52) U.S. Cl. ..................... 210/682; 210/758
(58) Field of Classification Search ........... 210/682, 210/758–763
See application file for complete search history.

(56) References Cited

U.S. PATENT DOCUMENTS

| 4,693,833 | A | * | 9/1987 | Toshikuni et al. | ........... 210/759 |
| 5,832,393 | A | * | 11/1998 | Omata et al. | .................. 588/20 |
| 2006/0283787 | A1 | * | 12/2006 | Pedee et al. | .................... 210/85 |

FOREIGN PATENT DOCUMENTS

| JP | 63-080896 A | 4/1988 |
| JP | 6-34720 Y2 | 9/1994 |
| JP | 09-038648 A | 2/1997 |

* cited by examiner

*Primary Examiner*—Chester T Barry
(74) *Attorney, Agent, or Firm*—Darby & Darby P.C.

(57) ABSTRACT

A method and apparatus for treating an effluent containing radioactive materials: wherein an oxidizing agent is added to an effluent containing radioactive materials, and the effluent including the oxidizing agent is filtered with a filtration film to obtain filtrated water; and the filtrated water is filtered through activated carbon; and the filtered water filtered by the activated carbon is filtered through at least one of an ion-exchanger and reverse osmosis membrane.

14 Claims, 2 Drawing Sheets

METHOD AND APPARATUS FOR TREATMENT OF AN EFFLUENT CONTAINING RADIOACTIVE MATERIALS

BACKGROUND OF THE INVENTION

1. Field of the Invention

The present invention relates to a method and an apparatus for treatment of an effluent containing radioactive materials, and especially relates to a method and an apparatus suitable for treatment of an effluent containing radioactive materials which is drained from a nuclear power plant.

Priority is claimed on Japanese Patent Application No. 2006-245293, filed Sep. 11, 2006, the content of which is incorporated herein by reference.

2. Description of Related Art

Regarding a method and an apparatus for treating an effluent containing radioactive materials, an effluent treatment apparatus using a microfiltration filter, particularly a hollow fiber membrane type microfiltration filter, has been applied in recent years in a treatment system for an effluent containing radioactive materials (radioactive waste water) such as an effluent containing radioactive materials drained from a nuclear power plant. Such an apparatus used for treating an effluent containing radioactive materials generally includes a demineralizer such as a mixed-bed type ion-exchange resin tower which is provided at the downstream position of a filter. For example, a treatment system as shown in FIG. 4 has been used wherein an effluent containing radioactive materials is kept at first in a storage tank 101 for an effluent containing radioactive materials, and then the effluent is sent from the tank to a hollow fiber membrane filtration tower 102 to filter the effluent, and subsequently, the obtained filtrated water is passed through a mixed-bed type ion-exchange resin tower 103 to conduct demineralization. Said treatment system is structured in general such that plural systems are provided separately, from the viewpoint of conducting treatments with high efficiency according to each property (water quality) of each discharged effluent containing radioactive materials. (For example, Japanese Unexamined Utility Model Application, Second Publication No. 6-34720.) However, there is a disadvantage in a space when plural apparatuses or the like used for said separate plural treatment systems are required to be placed according to plural kinds of discharged effluent containing radioactive materials. Accordingly, a method has been proposed in recent years wherein ion-loaded waste liquids such as an equipment drain effluent generated from each peace of equipments and floor drain effluent generated from each building, which can be treated comparatively easily, are treated together using the same system and apparatus.

Differential pressure of a filtration apparatus (microfiltration filter) increases gradually due to an organic substance, bacteria, submaterials used at the time of plant inspection or the like, which are included in an effluent, when a radioactive waste liquid (an effluent containing radioactive materials) is treated in such a system wherein a microfiltration filter is provided and a demineralization tower is arranged in a downstream position of the microfiltration filter as described above. Particularly, a floor drain effluent containing radioactive materials includes comparatively large amounts of impurities such as an organic substance and bacteria, and the differential pressure of the filtration apparatus tends to increase earlier when said floor drain effluent is treated. Filtration efficiency or the like deteriorates when the differential pressure of the filtration apparatus increases. Therefore, in order to return the increased differential pressure to a normal level of differential pressure, a periodic recovery treatment is conducted wherein the operation of an apparatus used for treating an effluent containing radioactive materials is stopped and then chemical cleaning for the filtration apparatus is conducted using an oxidizing agent such as hydrogen peroxide regularly. When the differential pressure of the filtration apparatus, specifically a difference between pressures prior to and after passing through the filtration apparatus, increases, the differential pressure can be reduced by conducting chemical cleaning using an oxidizing agent. However, there are further demands for decreasing the number of chemical cleaning operations to as few as possible, in order to decrease the burden of an operator, to prevent oxidation deterioration of a filtration film and the like.

Moreover, regarding the control of an increase of differential pressure of a filtration apparatus, it has been described in (although the following documents do not disclose a system for treatment of an effluent containing radioactive materials) Japanese Unexamined Patent Application, First Publication, Nos. Sho 63-80896 and Hei 9-38648, that an increase of differential pressure of a filtration film can be suppressed due to the addition of a trace amount of an oxidizing agent which is injected continuously or intermittently at an upstream position of a filtration apparatus. However, although an effect for suppressing an increase of the differential pressure of the filtration film may be observed, oxidization deterioration of an ion-exchange resin provided at a downstream position of the filtration apparatus may occur if such a method wherein an oxidizing agent is injected is used. Accordingly, such a method has not been adopted in any system for treating an effluent containing radioactive materials, particularly in a system for treating an effluent containing radioactive materials which is generated in a nuclear power plant.

SUMMARY OF THE INVENTION

The purpose of the present invention is to provide a method and apparatus for treating an effluent containing one or more radioactive materials, wherein the method and apparatus can suppress an increase of a differential pressure of a filtration apparatus and do not cause oxidization deterioration of an ion-exchange resin or the like which is provided at a downstream position of a filtration apparatus when they are applied to treatment of an effluent containing radioactive materials actually.

The present invention is achieved in accordance with: a demand for reducing the number of chemical cleaning operations required to be conducted periodically for treatment of general effluent containing radioactive materials (in other words, the demand for suppressing an increase of the differential pressure of a filtration apparatus); and the knowledge wherein the effect for suppressing an increase of differential pressure of a filtration apparatus is observed when an oxidizing agent is added, although said knowledge does not belong to a technology of a treatment system for an effluent containing radioactive materials.

A first aspect of the present invention is a method for treating an effluent containing radioactive materials, wherein the method comprises:

adding an oxidizing agent to an effluent containing radioactive materials;

filtering the effluent including the oxidizing agent with a filtration film to obtain filtrated water;

filtering the filtrated water through activated carbon; and filtering the filtered water filtered by the activated carbon through at least one of an ion-exchanger and reverse osmosis membrane.

A second aspect of the present invention is an apparatus, which comprises an oxidizing agent adding member wherein an oxidizing agent is added to an effluent containing radioactive materials;

a filtration member wherein the effluent including the oxidizing agent is filtered through a filtration film to obtain filtered water;

an activated carbon tower wherein the filtered water is filtered through activated carbon; and and at least one of an ion-exchange unit filled with an ion-exchanger and a reverse osmosis membrane, by which the filtered water filtered by the activated carbon is filtered.

DETAILED DESCRIPTION OF THE INVENTION

Figure 1:
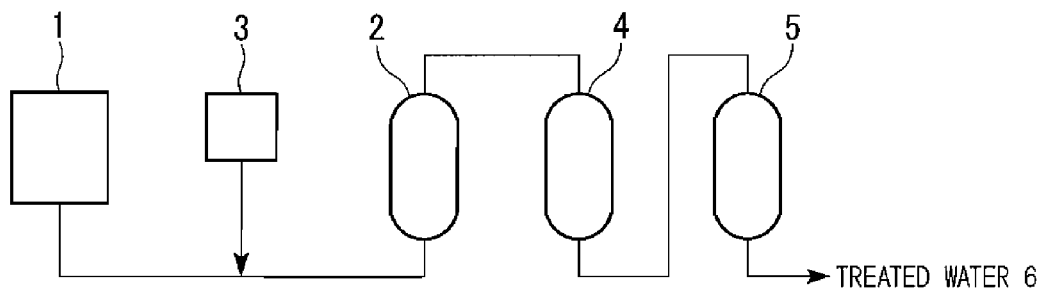
FIG. 1 shows a schematic block diagram of an apparatus for treating an effluent containing radioactive materials according to an embodiment of the present invention.

In the treatment method and apparatus of the present invention, an increase of differential pressure of a filtration film is suppressed due to the addition of an oxidizing agent to an effluent. Then, after conducting the filtration, filtered water which includes the oxidizing agent, but from which materials to be removed by the filtration have been removed, is filtered through an activated carbon in order to remove the oxidizing agent and prevent oxidization deterioration of an ion-exchanger and a reverse osmosis membrane provided at a downstream position of the filtration film, since said oxidization deterioration is caused by the oxidizing agent flowed to the ion-exchanger and the reverse osmosis membrane. In this way, the oxidizing agent is removed from water by the activated carbon. Due to the method described above, both effects can be achieved wherein an increase of differential pressure of a filtration film can be suppressed and oxidization deterioration of an ion-exchanger and a reverse osmosis membrane located at a downstream position of a filtration filter, wherein such a deterioration is caused by the oxidizing agent, can be suppressed. Accordingly, stable treatment is possible over a long period of time since the number of chemical cleaning operations of a filtration film can be greatly decreased due to the suppression of an increase of differential pressure of the film, and oxidation deterioration of an ion-exchanger or a reverse osmosis membrane can be prevented.

In the present invention, increase of a differential pressure of a filtration film can be suppressed by addition of an oxidizing agent to an effluent. Accordingly, it is possible to treat in one system a mixture of plural effluents containing radioactive materials such as a mixture containing a floor drain effluent containing radioactive materials and an equipment drain effluent containing radioactive materials. As a result, it is possible to simplify a treatment system vastly, and also possible to reduce equipment space significantly.

In the method for treating an effluent containing radioactive materials according to the present invention, an oxidizing agent is preferably added in small quantities successively.

Due to the continuous addition of an oxidizing agent, it is possible to provide a function of suppressing an increase of differential pressure of the filtration film with high efficiency. As a result, it becomes possible to suppress a rapid increase of differential pressure, and also possible to postpone timing of required chemical cleaning or the like efficiently. On the other hand, it is also possible to add an oxidizing agent intermittently in predetermined small quantities. The timing of addition of an oxidizing agent can be selected as needed.

An oxidizing agent is preferably used in the present invention, which does not provide much of load to an ion-exchanger and a reverse osmosis membrane even when very small amounts of the oxidizing agent escape from the activated carbon and arrive at the ion-exchanger and reverse osmosis membrane. Hydrogen peroxide or the like can be used as the oxidizing agent. The use of a very small amount of the oxidizing agent may work effectively. For example, it is possible to achieve a desired effect only by adding a very small amount of hydrogen peroxide of about 1 ppm or less.

It is preferable that a filtration film excellent in durability regarding an oxidizing agent (filtration film having oxidation-resistant) be used in the present invention. Examples of the filtration film include a poly vinylidene fluoride film (it may be called a PVDF film), polysulfone film (PSF film), polyethylene film (PS film) and polyether sulfone film (PES film). These films may be used in the form of a hollow fiber membrane, and the use of the hollow fiber membrane enables filtration to be conducted efficiently.

When an ion-exchanger is used in the present invention, demineralization treatment can be performed by the ion-exchanger to obtain treated water. Any ion-exchanger can be selected as required, and examples thereof include an ion-exchange resin. The ion-exchange resin may be a cation-exchange resin and/or an anion-exchange resin. It is particularly preferable that an ion-exchange resin tower be used wherein a mixed-bed form including a cation-exchange resin and an anion-exchange resin is applied. On the other hand, when a reverse osmosis membrane is used in the present invention, concentration treatment is performed using it to obtain filtered water as treated water. Concentrated water, which is also generated when the treated water is produced, can be treated as required. For example, the concentrated water can be maintained as required.

An apparatus for treatment of an effluent containing radioactive materials of the present invention is an apparatus characterized in that the apparatus includes: an oxidizing agent adding member wherein an oxidizing agent is added to an effluent containing radioactive materials; a filtration member wherein the effluent including the oxidizing agent is filtered through a filtration film; an activated carbon tower wherein the filtered water flowed from the filtration member is filtered through activated carbon; and at least one of (i) an ion-exchange unit filled with an ion-exchanger and (ii) a reverse osmosis membrane, by which the water filtered by the activated carbon is further filtered. Here, the aforementioned members and the like used in the present invention may mean instrument, device, system, unit, means and the like.

The apparatus for treatment of an effluent containing radioactive materials according to the present invention may further include a member which mixes an equipment drain effluent and a floor drain effluent, wherein these effluents include radioactive materials. The treatment apparatus of the present invention may be formed such that an oxidizing agent is added to the mixed effluents which are mixed in the mixing member and then the mixture is supplied to the filtration film as an effluent to be treated.

It is preferable that the oxidizing agent adding member be a member which supplies an oxidizing agent to an effluent containing radioactive materials to be treated successively. It is also possible to use a member wherein a small amount of an oxidizing agent is supplied to an effluent containing radioactive materials intermittently.

Examples of the oxidizing agent used for the apparatus of the present invention include those cited in the method of the present invention. For example, hydrogen peroxide can be used for the apparatus. Examples of the filtration film usable for the apparatus of the present invention include a poly vinylidene fluoride film.

Examples of the ion-exchanger include an ion-exchange resin, and an ion-exchange resin tower which has a mixed-bed form including a cation-exchange resin and an anion-exchange resin can be used in the present invention.

The treatment method and apparatus for an effluent containing radioactive materials of the present invention are especially suitable for treating an effluent containing radioactive materials generated in a nuclear power plant. There have been no conventional examples wherein a treatment system as that disclosed in the present invention is used for treatment of an effluent containing radioactive materials generated in a nuclear power plant.

Due to the method and apparatus for treating an effluent containing radioactive materials according to the present invention, an increase of differential pressure of a filtration apparatus can be suppressed by the effect of addition of an oxidizing agent. Furthermore, due to the use of an activated carbon, it is possible to prevent a flow of the oxidizing agent to the ion-exchange resin or the like almost completely, and an ion-exchange resin or the like, which is provided at a downstream position of the filtration apparatus, can treat water from which the ion-exchange resin is removed. Accordingly, oxidization deterioration of an ion-exchange resin or the like, in which the ion-exchange resin is positioned at the downstream position of a filtration unit and the oxidization deterioration is a problem caused by the addition of an oxidizing agent, can be also solvable by the present invention. As a result of being able to delay an increasing speed of differential pressure of a filtration apparatus greatly, the number of chemical cleaning operations of the filtration unit can be reduced greatly.

Moreover, as a result of being able to control an increase of differential pressure of a filtration apparatus greatly by addition of an oxidizing agent, it is also possible to exclude the necessity for preparing plural treatment systems separately according to each kind of effluent containing radioactive materials. For example, it is possible to treat a floor drain effluent containing radioactive materials and an equipment drain effluent containing radioactive materials at once after mixing them for the treatment. As a result, it is possible to simplify a treatment system vastly, and possible to decrease equipment space of a treatment system greatly.

Hereinafter, preferable embodiments of the present invention are explained while referring to figures. FIG. 1 shows a treatment apparatus for an effluent containing radioactive materials according to one embodiment of the present invention. The figure represents an apparatus which is suitable for treating an effluent containing radioactive materials produced in a nuclear power plant. In the embodiment, the effluent containing radioactive materials is at first stored in a storage tank 1 for an effluent containing radioactive materials, and then, the required amount of the effluent is sent to a treatment apparatus from the storage tank. When the radioactive material-containing effluent to be treated is stored, it is possible to mix a floor drain effluent containing radioactive materials and an equipment drain effluent containing radioactive materials and store it and then send the mixed effluent to a treatment unit as described above.

The effluent (water to be treated) from the storage tank 1 is sent to a hollow fiber membrane filtration tower 102 as a filtering member, in which a hollow fiber membrane is set, and filtered. Hydrogen peroxide is added as an oxidizing agent in a prior step of the filtering, and in the embodiment, addition of hydrogen peroxide to the effluent is performed such that the hydrogen peroxide is injected to a treatment line. A hydrogen peroxide storage tank 3 is provided as a member for adding an oxidizing agent, and stored hydrogen peroxide is injected in small amounts and at a controlled flow rate into an effluent containing radioactive materials continuously with a pouring pump or the like, which is not shown in the figure.

In the hollow fiber membrane filtration tower 102, the effluent containing radioactive materials to which hydrogen peroxide is added is filtered using a hollow fiber filtration membrane. After the filtering conducted at the tower 102, the filtered water is further passed through an activated carbon tower 4 filled with activated carbon in order to resolve and remove hydrogen peroxide which has been added to the effluent.

The filtered water from which hydrogen peroxide is removed is further passed through a mixed-bed type ion-exchange resin tower 5 wherein ion-exchange resins are filled in the form of a mixed bed. Then, water in which demineralization treatment has been conducted at the mixed-bed type ion-exchange resin tower 5 is obtained as treated water 6. The treated water 6 can be sent to a predetermined position, for example, to a storage tank for treated water (not shown).

In the embodiment, a mixed-bed type ion-exchange resin tower is used for a demineralization treatment, but it is also possible to conduct a concentration treatment using a reverse osmosis membrane as described above.

The treatment method and apparatus for an effluent containing radioactive materials according the present invention can be applied to any use in which efficient treatment of an effluent containing radioactive materials is required, and especially, they are effective for treatment of an effluent containing radioactive materials produced in a nuclear power plant. The present invention can provide a treatment method and apparatus for an effluent containing radioactive materials, wherein it is possible to control an increase of differential pressure of a filtration apparatus without causing oxidization deterioration of an ion-exchange resin and the like.

EXAMPLES

Hereinafter, examples which were conducted to verify the effects of the present invention are explained.

Example 1

Treatments were conducted in accordance with a flow chart shown in FIG. 1. In order to simulate the load of organic impurity, test water to be treated was prepared such that 250 ppm of polyacrylamide-based high molecular coagulant were added to pure water. Two types of continuous addition (1 ppm and 10 ppm) of hydrogen peroxide for the test water were conducted, and a blank test in which hydrogen peroxide was not added to test water was also prepared and evaluated for comparison. As a hollow fiber membrane filtration tower, a test module in which a hollow fiber membrane made of polyvinylidene fluoride and having a pore size of 0.4 micrometers was used was produced and used for the tests. Flow rate of water passing through the hollow fiber membrane filtration tower was 0.4 m/h. Chemical cleaning for the blank test in which hydrogen peroxide had not been added was performed when the differential pressure thereof arrived at predetermined values. Chemical cleaning for said two types of water to which 1 ppm or 10 ppm of hydrogen peroxide was added was also conducted at the same timing when chemical cleaning for the blank test was conducted.

Figure 2:
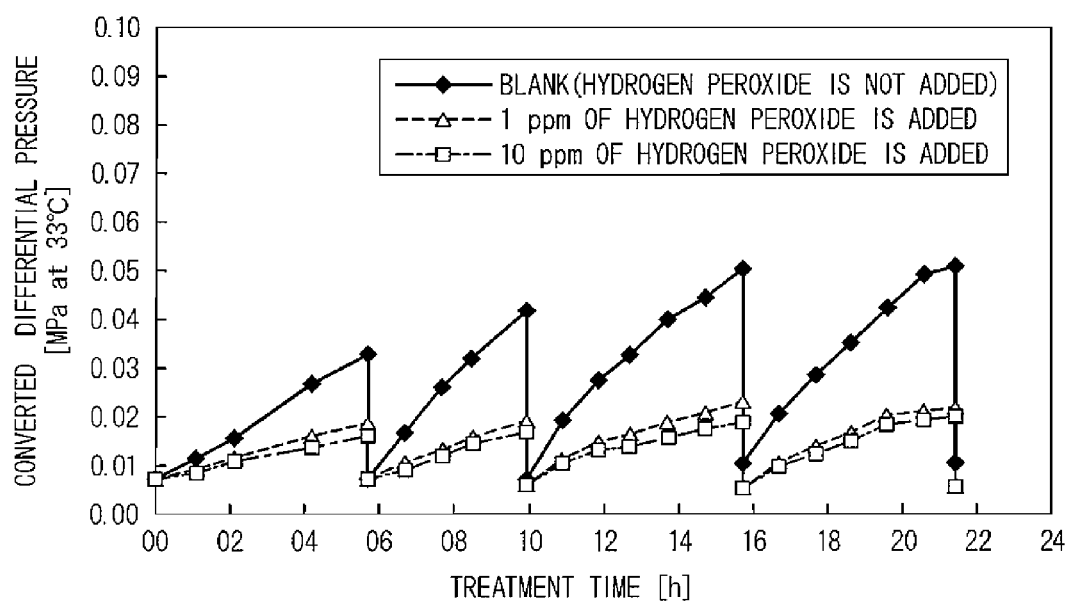
FIG. 2 shows a relational diagram which shows a relationship between filtering time and an increase of differential pressure of Example 1.

The variations of the differential pressure thereof are shown in FIG. 2. FIG. 2 shows that chemical cleaning for the blank test was performed when the differential pressure arrived at predetermined values, and chemical cleanings for the two test waters to which 1 ppm or 10 ppm of hydrogen peroxide was added were also conducted at the same timing. The increase rate of the differential pressure of the test waters according to the present invention was reduced to the degree such that the increase rate of the test waters to which hydrogen peroxide was added was ½ to ⅓ as compared with those of the blank test. In this way, it was confirmed that addition of hydrogen peroxide was effective, and was particularly effective when continued feeding of hydrogen peroxide was conducted. Furthermore, it was confirmed that sufficient effects can be achieved even by the addition of 1 ppm of hydrogen peroxide, and it was found from the FIG. 2 that hydrogen peroxide less than 1 ppm would be effective to suppress the increase of the differential pressure.

Moreover, the filtered water to which 10 ppm of hydrogen peroxide had been added and was treated by the hollow fiber membrane filtration tower was passed through an activated carbon column, and concentrations of hydrogen peroxide were evaluated at both positions of an outlet and an inlet of the activated carbon column. As the activated carbon, DIAHOPE 006EA (manufactured by Calgon Mitsubishi Chemical Corporation) was used, and flow rate of water passing through the tower was set to SV 10/h (SV: space velocity). Evaluation results are shown in Table 1. Concentration of hydrogen peroxide of a sample collected at the inlet position of the activated carbon column was 9.6 ppm, and those collected at the outlet position of the activated carbon column were 0.1 ppm or less. In this way, it was confirmed that the added hydrogen peroxide can be resolved nearly completely.

TABLE 1

| Measurement sample | Concentration of hydrogen peroxide |
|---|---|
| Test water | 10 ppm |
| Water collected at the inlet position of the activated carbon column | 9.6 ppm |
| Water collected at the outlet position of the activated carbon column | <0.1 ppm |

Example 2

In order to simulate the load of bacteria, test water to be treated was prepared such that 250 ppm of activated sludge was added to pure water. Two types of continuous addition (1 ppm and 10 ppm) of hydrogen peroxide to the test water were conducted, and a blank test in which hydrogen peroxide was not added was also prepared and evaluated. As a hollow fiber membrane filtration tower, a test module, in which a hollow fiber membrane made of poly vinylidene fluoride and having a pore size of 0.4 micrometers was used, was produced and used for the test. Flow rate of water passing through the hollow fiber membrane filtration tower was 0.4 m/h. Chemical cleaning for the blank test in which hydrogen peroxide had not been added was performed when the differential pressure thereof was reached to predetermined values. Chemical cleaning for two test waters to which 1 ppm or 10 ppm of hydrogen peroxide was added was also conducted at the same timing when chemical cleaning for the blank test was conducted.

Figure 3:
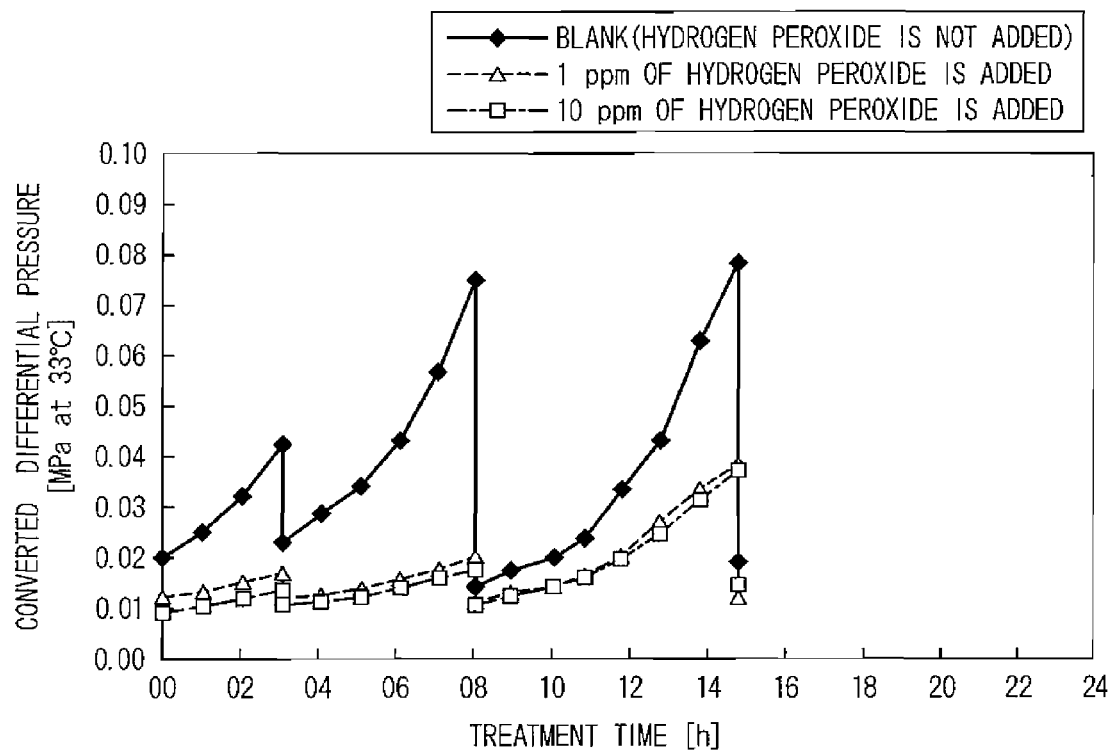
FIG. 3 shows a relational diagram which shows a relationship between filtering time and an increase of differential pressure of Example 2.
Figure 4:
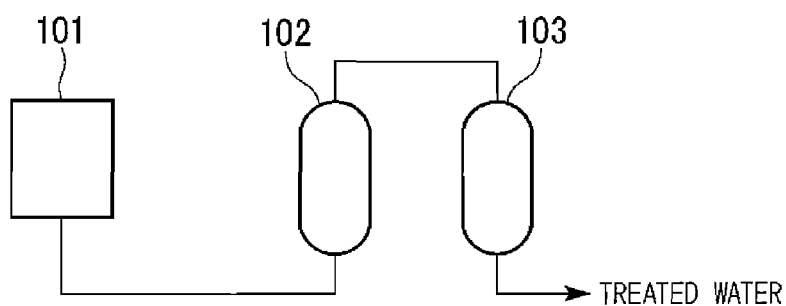
FIG. 4 shows a schematic block diagram of an example of a conventional apparatus for treating an effluent containing radioactive materials.

The variations of the differential pressure are shown in FIG. 3. FIG. 3 shows that chemical cleaning of the blank test to which hydrogen peroxide was not added was performed when the differential pressure arrived at the predetermined values, and chemical cleaning for the two test waters to which 1 ppm or 10 ppm of hydrogen peroxide was added was also conducted at the same timing. Similar to Example 1, the increase rate of the differential pressure wherein the test water to which hydrogen peroxide was added was used can be reduced such that the rate of increase was ½ to ⅓ of those of the blank test and it was confirmed that addition of hydrogen peroxide was effective.

It was observed from the results of Examples 1 and 2, especially from the results shown by FIG. 2 and FIG. 3, that when hydrogen peroxide was added, the increase rate of the differential pressure of a filter can be decreased extremely to the degree of ½ to ⅓ of the blank test. The results mean that timing for conducting chemical cleaning can be postponed vastly, and the number of chemical cleaning operations can be reduced greatly. Furthermore, from the results shown in FIG. 1, it can be seen that oxidization deterioration of an ion-exchange resin or the like can be prevented even if hydrogen peroxide is added, since hydrogen peroxide can be removed from water nearly completely due to the carbon oxide before water arrives at the ion-exchanger or the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for treating an effluent containing radioactive materials, wherein the method comprises:
   adding an oxidizing agent to an effluent containing radioactive materials;
   filtering the effluent including the oxidizing agent with a filtration film to obtain a filtrated water;
   filtering the filtrated water through activated carbon so as to remove the oxidizing agent; and
   filtering the filtered water filtered by the activated carbon through at least one of an ion-exchanger and a reverse osmosis membrane.

2. The method for treating an effluent containing radioactive materials according to claim 1, wherein the effluent containing radioactive materials is a mixture of a floor drain effluent containing radioactive materials and an equipment drain effluent containing radioactive materials.

3. The method for treating an effluent containing radioactive materials according to claim 1, wherein the oxidizing agent is added continuously.

4. The method for treating an effluent containing radioactive materials according to claim 1, wherein the oxidizing agent is hydrogen peroxide.

5. The method for treating an effluent containing radioactive materials according to claim 1, wherein a polyvinylidene fluoride film is used as the filtration film.

6. The method for treating an effluent containing radioactive materials according to claim 1, wherein an ion-exchange resin is used as the ion-exchanger.

7. The method for treating an effluent containing radioactive materials according to claim 1, wherein an effluent containing radioactive materials generated by a nuclear power plant is treated.

8. An apparatus for treating an effluent containing radioactive materials, which comprises
- an oxidizing agent adding member wherein an oxidizing agent is added to an effluent containing radioactive materials;
- a filtration member wherein the effluent including the oxidizing agent is filtered through a filtration film to obtain filtered water;
- an activated carbon tower wherein the filtered water is filtered through activated carbon so as to remove the oxidizing agent; and
- at least one of an ion-exchange unit filled with an ion-exchanger and a reverse osmosis membrane by which the filtered water filtered by the activated carbon is further filtered.

9. The apparatus for treating an effluent containing radioactive materials according to claim 8, wherein the apparatus further comprises a mixing member which mixes a floor drain effluent containing radioactive materials and an equipment drain effluent containing radioactive materials, and mixed effluents are supplied as the effluent containing radioactive materials to which the oxidizing agent is added.

10. The apparatus for treating an effluent containing radioactive materials according to claim 8, wherein the oxidizing agent adding member is a member which feeds the oxidizing agent successively.

11. The apparatus for treating an effluent containing radioactive materials according to claim 8, wherein the oxidizing agent is hydrogen peroxide.

12. The apparatus for treating an effluent containing radioactive materials according to claim 8, wherein a polyvinylidene fluoride film is used as the filtration film.

13. The apparatus for treating an effluent containing radioactive materials according to claim 8, wherein an ion-exchange resin is used as the ion-exchanger.

14. The apparatus for treating an effluent containing radioactive materials according to claim 8, wherein an effluent containing radioactive materials generated by a nuclear power plant is treated as the effluent containing radioactive materials.

* * * * *